United States Patent
Kageshima

[19]

[11] Patent Number: 5,941,991
[45] Date of Patent: Aug. 24, 1999

[54] METHOD OF ESTIMATING POWER CONSUMPTION OF EACH INSTRUCTION PROCESSED BY A MICROPROCESSOR

[75] Inventor: Atsushi Kageshima, Tokyo, Japan

[73] Assignee: Kabushiki Kaisha Toshiba, Kawasaki, Japan

[21] Appl. No.: 08/895,695

[22] Filed: Jul. 17, 1997

[30]    Foreign Application Priority Data

Jul. 19, 1996 [JP] Japan ................................. P8-190456

[51] Int. Cl.$^6$ ...................................................... G06F 1/00
[52] U.S. Cl. ........................ 713/340; 712/237; 712/238; 713/300; 713/400; 395/500.41
[58] Field of Search .............................. 364/261.3, 262.4, 364/263.1, 231.8, 243.4, 578; 395/500, 584, 585, 750.1, 750.8, 500.41; 712/237, 238; 713/300, 340, 400

[56]    References Cited

U.S. PATENT DOCUMENTS 5,557,557  9/1996  Frantz et al. ............................. 364/578
5,682,320  10/1997  Khouja et al. ........................... 364/489
5,694,607  12/1997  Dunstan et al. .......................... 395/750
5,752,259  5/1998  Tran ........................................ 711/125

OTHER PUBLICATIONS

Li et al., Performance Estimation of Embedded Software with Instruction Cache Modeling, (1995), pp. 380–387.
Vivek Tiwari, et al., "Power Analysis of Embedded Software: A First Step towards Software Power Minimization", IEEE–94, pp. 384–390, 1994.

Primary Examiner—Ayaz R. Sheikh
Assistant Examiner—Frantz Blanchard Jean
Attorney, Agent, or Firm—Foley & Lardner

[57]    ABSTRACT

This invention provides a method of estimating the power consumption of a microprocessor with the use of an instruction file that is simple and easy to prepare. A microprocessor (3, 4) reads instructions out of a main memory (2) or an instruction cache (1) and executes them. A group of instructions that include at least one target instruction whose power consumption is to be estimated is repeatedly executed in simulations, to find the power consumption of the microprocessor on the target instruction in a cache miss state, as well as the power consumption of the microprocessor on the target instruction in a cache hit state, according to the power consumption of the microprocessor in given cycles.

6 Claims, 9 Drawing Sheets

FIG.7

```
START:
      TARGET INSTRUCTION
      TARGET INSTRUCTION
      TARGET INSTRUCTION
      TARGET INSTRUCTION
      TARGET INSTRUCTION
             .
             .
             .
             .
             .
             .
             .
      JUMP START
```

FIG.8

| null | null | null | null |
|------|------|------|------|
| null | null | null | null |
| null | null | null | null |
| null | null | null | null |
| . | . | . | . |
| . | . | . | . |
| . | . | . | . |

FIG.9

| START | TARGET INSTRUCTION | TARGET INSTRUCTION | TARGET INSTRUCTION |
|-------|--------------------|--------------------|--------------------|
| TARGET INSTRUCTION | TARGET INSTRUCTION | TARGET INSTRUCTION | TARGET INSTRUCTION |
| TARGET INSTRUCTION | TARGET INSTRUCTION | TARGET INSTRUCTION | TARGET INSTRUCTION |
| TARGET INSTRUCTION | TARGET INSTRUCTION | TARGET INSTRUCTION | TARGET INSTRUCTION |
| . | . | . | . |
| . | . | . | . |
| JUMP | . | . | . |
|  | . | . | . |

FIG.10

| W | F | D | E |
|---|---|---|---|
| M | W | F | D |
| E | M | W | F |
| D | E | M | W |
| F | D | E | M |

FIG.11

| W | F | D | E |   |
|---|---|---|---|---|
| M | W | F | D |   |
| E | M | W | F |   |
| D | E | M | W |   |
| F | Ds| D | E | M |

F,D,E,M,&W STAGES=4 } INSTRUCTION CACHE HIT=3
Ds STAGES = 1 } INSTRUCTION CACHE MISS=1

START:

TARGET INSTRUCTION
    TARGET INSTRUCTION
    TARGET INSTRUCTION
    TARGET INSTRUCTION
    TARGET INSTRUCTION
    TARGET INSTRUCTION
    TARGET INSTRUCTION
    TARGET INSTRUCTION
    TARGET INSTRUCTION
    JUMP START

START:

TARGET INSTRUCTION
    JUMP START

METHOD OF ESTIMATING POWER CONSUMPTION OF EACH INSTRUCTION PROCESSED BY A MICROPROCESSOR

BACKGROUND OF THE INVENTION

1. Field of the Invention

The present invention relates to a method of estimating the power consumption of a microprocessor on each instruction the microprocessor reads out of a main memory or an instruction cache and executes.

2. Description of the Prior Art

Computer technologies and semiconductor integrated circuits have made great progress recently, and accordingly, electronic equipment, in particular, personal computers have improved their compactness and portability. Under these circumstances, an important subject is to improve the processing speed of microprocessors as well as reducing the power consumption thereof. To achieve a reduction in power consumption, it is necessary to correctly evaluate the power consumption of a microprocessor when designing the same.

An example of a technique of evaluating the power consumption of a microprocessor is disclosed in "Power Analysis of Embedded Software; A First Step towards Software Power Minimization" of Vivek Tiwari, Sharad Malik, and Andrew Wolfe in IN IEEE-94, pp. 384–390 (1994). This is a method of evaluating the power consumption of a microprocessor including software.

This method pays attention to the kind of each instruction to be executed by a microprocessor and estimates the power consumption of the microprocessor. Namely, the method finds out the individual power consumption of different instructions to be executed by the microprocessor in advance, applies the found power consumption to each instruction that is still in an assembler program, and estimates total power to be consumed by the instructions when they are actually executed by the microprocessor.

This method executes a given instruction by the microprocessor and measures the power consumption thereof with a power meter connected to the microprocessor. If the microprocessor employs an instruction cache, it is necessary to separate cache-hit power consumption from cache-miss power consumption. These two kinds of power consumption are unable to be found out with the use of a single instruction file. Namely, it is necessary to prepare an instruction file 101 of FIG. 1 for measuring the cache-miss power consumption of each instruction, as well as an instruction file 102 of FIG. 2 for measuring the cache-hit power consumption of each instruction.

The instruction file 101 consists of a state setting section 103 for setting a microprocessor in a cache miss state, and a target instruction executing section 104 for executing target instructions for which power consumption is going to be estimated. The instruction file 102 consists of a state setting section 103 for setting a microprocessor in a cache hit state, and a target instruction executing section 104 for executing target instructions for which power consumption is going to be estimated. The state setting section 103 of FIG. 1 disables cached instructions and establishes a cache miss state, and the state setting section 103 of FIG. 2 executes, in advance, codes used by the instruction executing section 104 and establishes a cache hit state. As a result, the instruction files 101 and 102 are each long and intricate, and therefore, are difficult to prepare.

In this way, the prior art of finding out the power consumption of a microprocessor, which has an instruction cache, on each instruction involves long and intricate instruction files to set measuring environments for the microprocessor. Such instruction files are very difficult to make because they need time and labor to prepare.

SUMMARY OF THE INVENTION

In view of these problems, an object of the present invention is to provide a method of estimating the power consumption of a microprocessor on each instruction, employing an instruction file that is simple and easy to prepare.

In order to accomplish the object, an aspect of the present invention provides a method of estimating the power consumption of a microprocessor on each instruction the microprocessor reads out of a main memory or an instruction cache and executes through pipelined processing stages. The method includes a step of consecutively executing, at least two times, a group of target instructions whose number is at least twice as large as the number of instructions to be simultaneously transferred from the main memory to the instruction cache, a step of finding the power consumption of the microprocessor in each cycle in a given range of cycles in each of the first and second executions of the instruction group, a step of accumulating the power consumption in each cycle for a given number of cycles in a given range of cycles in the first execution of the instruction group, to find out the power consumption of the microprocessor for the given number of cycles, and a step of using the power consumption for the given number of cycles in the first execution of the instruction group and the power consumption in each cycle in the second execution of the instruction group, to estimate the power consumption of the microprocessor of reading a cache-hit instruction out of the instruction cache and executing the same, as well as the power consumption of the microprocessor of reading a cache-missed instruction out of the main memory and executing the same. The instructions are executed in transistor- or gate-level simulations.

According to another aspect of the present invention, the estimated power consumption (Ph) of the microprocessor on a cache-hit instruction is obtained as the power consumption thereof in a given cycle in the second execution of the instruction group. On the other hand, the estimated power consumption (Pm) of the microprocessor on a cache-missed instruction is obtained as follows:

$Pm=\{$the sum of power consumption for "$I+N$" cycles starting from the "$P+N$"th cycle in the first execution of the instruction group$\}-\{(I-1)\times Ph\}$ where P is the number of the pipelined processing stages, I is the number of instructions to be simultaneously transferred from the main memory to the instruction cache when a cache miss occurs, and N is the total number of stalls to occur when executing the I instructions simultaneously transferred to and stored in the instruction cache.

Still another aspect of the present invention provides a method of estimating the power consumption of a microprocessor on a target instruction the microprocessor reads out of a main memory or an instruction cache and executes through pipelined processing stages. The method includes a step of executing, at least twice, the target instruction, a step of finding the power consumption of the microprocessor in one cycle in a given range of cycles in each of the first and second executions of the target instruction, a step of accumulating the power consumption in one cycle for a given number of cycles in the given range of cycles in the first execution of the target instruction, to find out the power consumption of the microprocessor for the given number of cycles, and a step of using the power consumption for the given number of cycles in the first execution of the target instruction and the power consumption in one cycle in the second execution of the target instruction, to estimate the cache-hit power consumption of the microprocessor of reading the target instruction out of the instruction cache and executing the same, as well as the cache-missed power consumption of the microprocessor of reading the target instruction out of the main memory and executing the same. The instruction is executed in transistor- or gate-level simulations.

Still another aspect of the present invention provides a system for estimating the power consumption of a microprocessor on each instruction the microprocessor reads out of a main memory or an instruction cache and executes. The system has a unit for entering a string of machine language instructions that include consecutive target instructions and a jump instruction to jump to the first one of the target instructions, the number of the target instructions being at least twice as large as the number of instructions simultaneously read out of the main memory, a unit for carrying out transistor- or gate-level simulations to simulate the microprocessor of reading the machine language instructions out of the main memory or the instruction cache and executing them, a unit for estimating the power consumption of the microprocessor on a cache-missed instruction according to the first execution of the consecutive target instructions, and a unit for estimating the power consumption of the microprocessor on a cache-hit instruction according to the second execution of the consecutive target instructions.

BRIEF DESCRIPTION OF THE DRAWINGS

FIG. 7 shows a general instruction file used by a method of estimating the power consumption of a microprocessor according to the present invention;

FIG. 8 shows the internal conditions of an instruction cache;

FIG. 9 shows the internal conditions of an instruction cache;

FIG. 10 shows modified pipelined processing stages based on FIG. 4;

FIG. 11 shows modified pipelined processing stages based on FIG. 3;

DETAILED DESCRIPTION OF THE EMBODIMENTS

A method of estimating the power consumption of a microprocessor according to the present invention will be explained with reference to the drawings.

Figure 1:
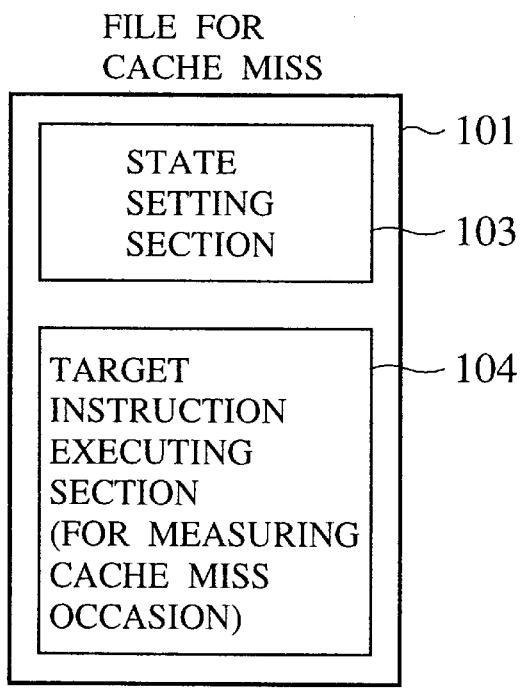
FIG. 1 shows the structure of an instruction file for a cache miss state, according to a prior art.
Figure 2:
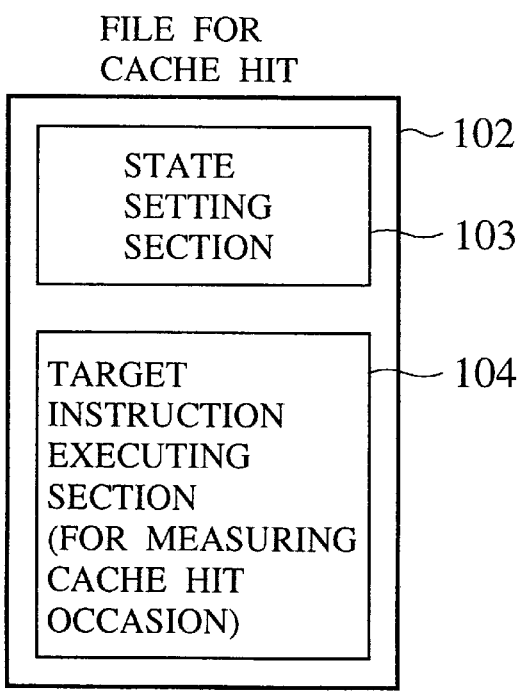
FIG. 2 shows the structure of an instruction file for a cache hit state, according to the prior art.
Figure 3:
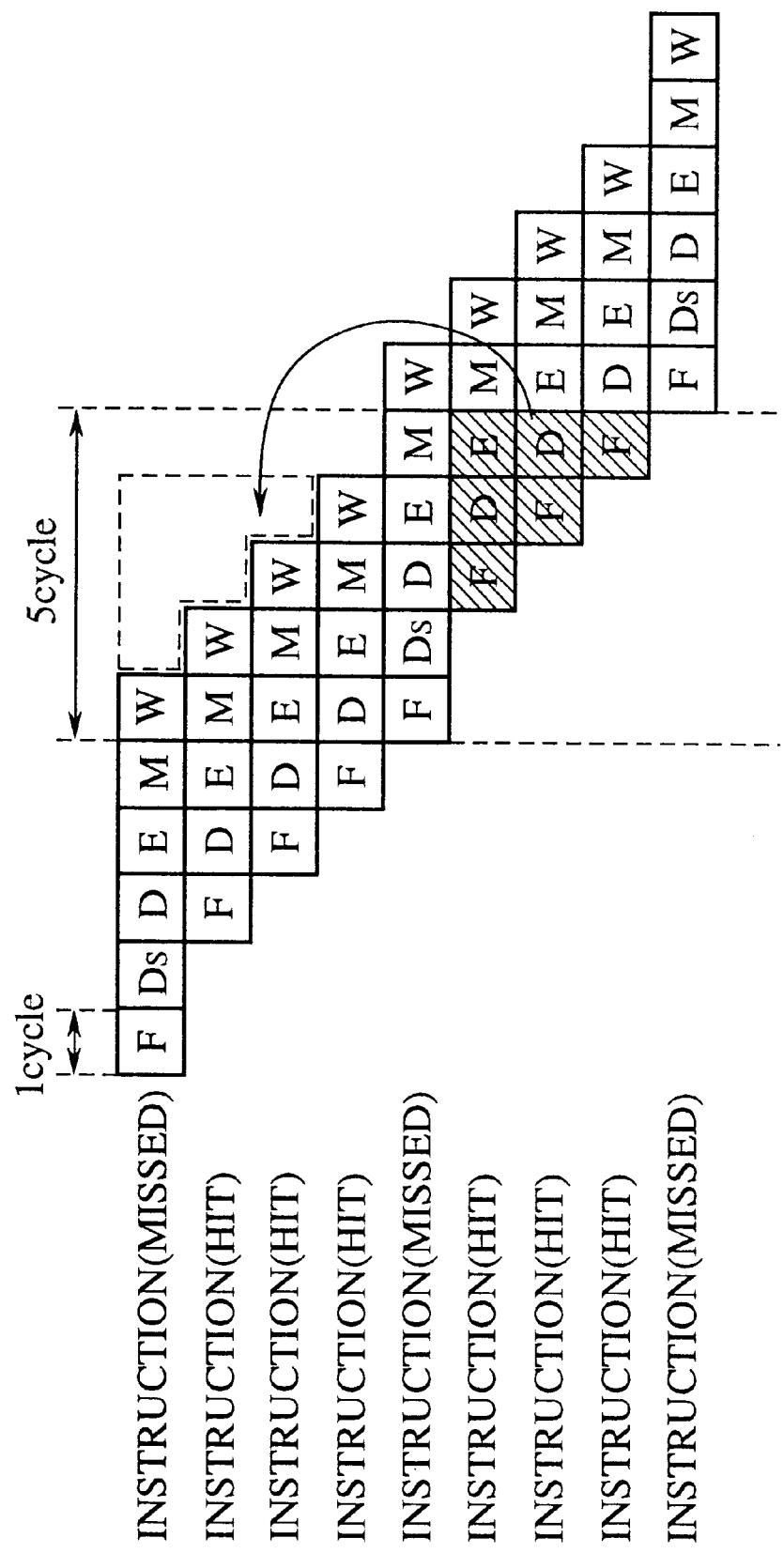
FIG. 3 shows pipelined processing stages involving cache misses in a microprocessor according to an embodiment of the present invention.
Figure 4:
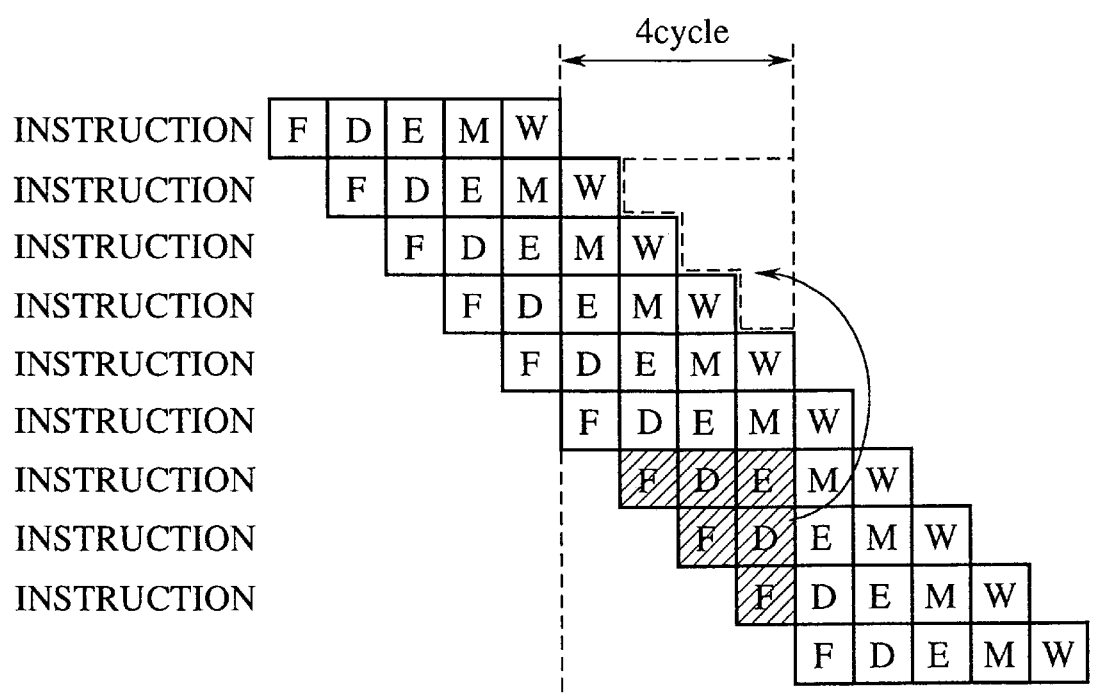
FIG. 4 shows pipelined processing stages involving cache hits in a microprocessor according to an embodiment of the present invention.

FIGS. 3 and 4 show pipelined processing stages in a microprocessor to which the method of the present invention is applied. The microprocessor that executes target instructions for which power consumption is estimated is a microprocessor 3 of FIG. 5 having an internal instruction cache 1 and an external main memory 2, or a microprocessor 4 of FIG. 6 having an external instruction cache 1 and an external main memory 2. The microprocessor executes the target instructions through the pipelined processing stages shown in FIGS. 3 and 4. The target instructions are listed in an instruction file of FIG. 7, which is used to simulate the power consumption of the microprocessor on each instruction. In the instruction file, the target instructions are consecutively arranged, and a jump instruction is arranged at the end of the target instructions so that the target instructions are repeatedly executed. The number of the target instructions in the instruction file is within the number of instructions to be stored in the instruction cache 1 of FIGS. 5 and 6.

Figure 5:
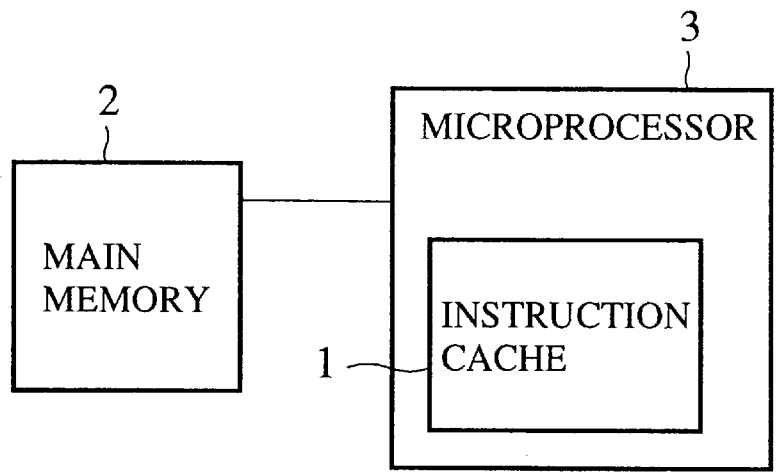
FIG. 5 shows the structure of a microprocessor according to an embodiment of the present invention.
Figure 6:
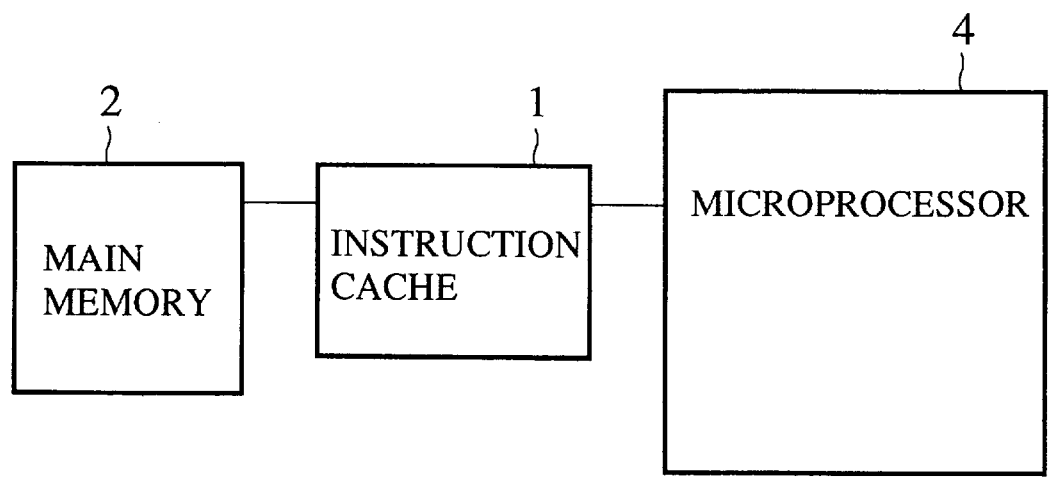
FIG. 6 shows the structure of another microprocessor according to an embodiment of the present invention.

Any one of the microprocessors 3 and 4 of FIGS. 5 and 6 executes instructions in five pipelined processing stages, i.e., a fetch stage (F), a decode stage (D), an execution stage (E), a data cache access stage (M), and a register write stage (W). Each stage is completed in one cycle. If an instruction cache miss occurs, four instructions are simultaneously read out of the main memory 2 in two cycles. Any cache miss causes a decode stall (Ds).

In the structure mentioned above, the target instructions of FIG. 7 are repeatedly executed due to the jump instruction. In a first execution of the instructions, the instruction cache 1 holds no instructions as shown in FIG. 8. Namely, all instructions are stored in the main memory 2 at this moment, and therefore, a cache miss occurs on every fourth instruction. More precisely, in the first execution, a cache miss occurs at first as shown in FIG. 3, and therefore, four target instructions are transferred from the main memory 2 to the instruction cache 1 and are stored therein. Thereafter, among the four target instructions, three that follow the first one are read out of the instruction cache 1 into the microprocessor, to produce cache hits. The same things happen thereafter. Namely, a cache miss occurs, and three cache hits follow. These are repeated.

Any cache-missed instruction is executed in a pipeline of the fetch stage F, decode stall Ds, decode stage D, execution stage E, data cache access stage M, and register write stage W, as shown in FIG. 3. On the other hand, any cache-hit instruction is executed in a pipeline of the fetch stage F, decode stage D, execution stage E, data cache access stage M, and register write stage W, as shown in FIG. 3. In this way, the microprocessor operates along the pipelines shown in FIG. 3.

In a second execution of the instructions of FIG. 7, the target instructions are stored in the instruction cache 1 in order of the first execution, as shown in FIG. 9. Then, every target instruction produces a cache hit. Consequently, every target instruction is executed through a pipeline of the fetch stage F, decode stage D, execution stage E, data cache access stage M, and register write stage W. In this case, the microprocessor operates along the pipelines shown in FIG. 4.

To find power consumption during the execution of cache-hit instructions, four cycles between the sixth and ninth cycles of the pipelined processing stages of FIG. 4 are extracted. This four cycles correspond to the number of instructions to be simultaneously transferred from the main memory 2 to the instruction cache 1. Hatched stages of FIG. 4 are moved into an upper dotted area of the same figure, to provide a pattern of FIG. 10.

It is to be understood from FIG. 10 that each cycle involves five stages, i.e., the fetch stage F, decode stage D, execution stage E, data cache access stage M, and register write stage W that are required to execute one cache-hit instruction. This means that the extracted four cycles have executed four instructions, or that each cycle has executed one instruction. Finding the power consumption of the microprocessor in any one of the four cycles leads to find the power consumption of the microprocessor on any cache-hit instruction the microprocessor reads out of the instruction cache 1 and executes.

On the other hand, to find power consumption in a cache miss state, five cycles are extracted starting from the sixth cycle, as shown in FIG. 3. The five cycles correspond to four instructions to be simultaneously transferred from the main memory 2 to the instruction cache 1 when a cache miss occurs, plus one stall that occurs when simultaneously transferring the four instructions to the instruction cache 1. The sixth cycle is equal to the number of the pipelined processing stages including the decode stall Ds. Hatched stages of FIG. 3 are moved to an upper dotted area of the same figure, to provide a pattern of FIG. 11.

The pattern of FIG. 11 involves four sets of the five stages, i.e., the fetch stage F, decode stage D, execution stage E, data cache access stage M, and register write stage W, and one decode stall stage Ds that occurs whenever a cache miss occurs. This means that the extracted five cycles involve one cache miss and three cache hits.

Since the power consumption of the microprocessor on each cache-hit instruction is obtainable as mentioned above, the power consumption of the microprocessor on each cache-missed instruction is obtainable by finding the power consumption of the extracted five cycles and by calculating {(the sum of power consumption for the five cycles)−(the power consumption in one cache-hit cycle)×3}.

This technique is applicable to a general case with the number of pipelined processing stages of a microprocessor being P, the number of instructions to be simultaneously transferred from a main memory to an instruction cache under a cache miss state being I, and the total number of stalls that occur when executing the I instructions simultaneously transferred to and stored in the instruction cache being N.

Namely, the power consumption of the microprocessor on each cache-hit instruction is obtained as the power consumption of the microprocessor in one cycle on or after the "P+1"th cycle in a second execution of instructions. On the other hand, a cache miss occurs at intervals of I cycles, N stalls occur on a cache miss, and "I−1" cache hits and one cache miss occur in "I+N" cycles starting from the "P+n"th cycle. Therefore, the power consumption of the microprocessor on each cache-missed instruction is obtained by calculating {the sum of power consumption for "I+N" cycles starting from the "P+N"th cycle in a first execution of instructions}−{(the power consumption in a cache-hit cycle)×(I−1)}.

To achieve the above-mentioned method, the present invention employs a system for simulating CPU operations at transistor or gate levels. The transistor-level simulations achieve fine operations to improve estimating accuracy, and therefore, take a long simulation time and many resources. On the other hand, the gate-level simulations are effective to carry out large-scale simulations in a short time.

These simulations may be achieved with simulators available on the market, for example "Power Mill" of Synopsys Co.

Figure 12:
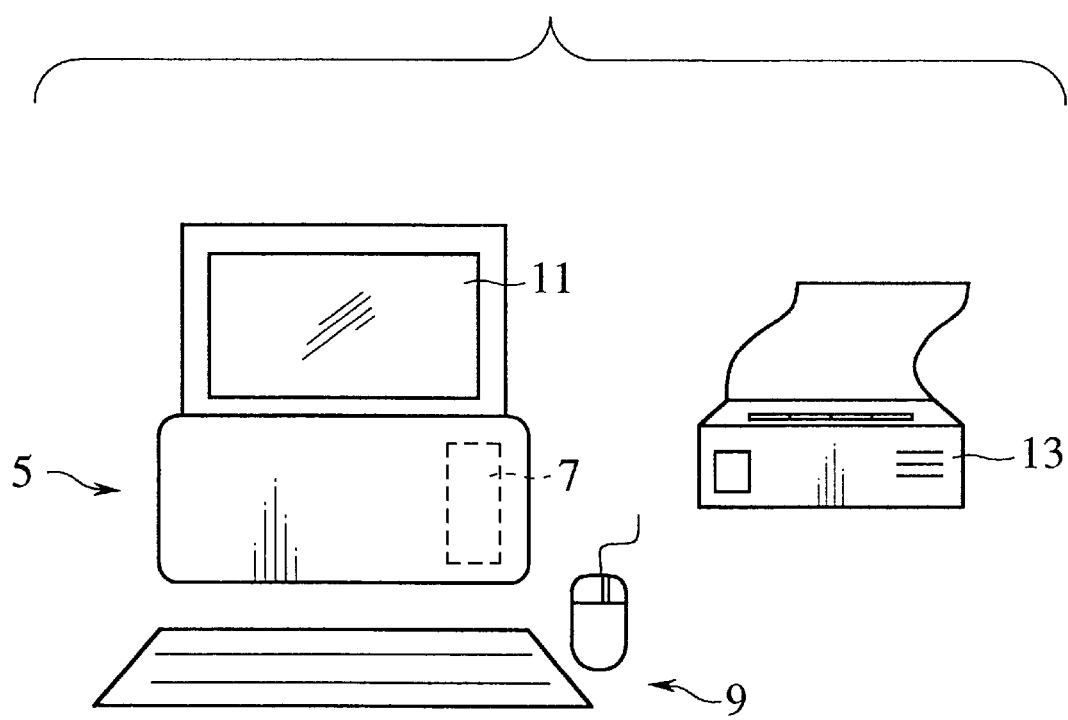
FIG. 12 shows a system for estimating the power consumption of a microprocessor according to the present invention.

FIG. 12 shows a system for estimating power consumption according to the present invention. The system consists of a computer 5, a storage unit 7 such as a disk unit, input units 9 such as a mouse and a keyboard, and output units including a monitor 11 and a printer 13. The system incorporates a simulation program for simulating the operations of CPU and memories at transistor or gate levels. The simulation program may be prepared by amending an existing one according to requirements.

A string of instructions such as those mentioned above are converted into machine language instructions at first. Instead, machine language instructions may directly be edited, or assembly language instructions are written, assembled, and edited. For example, the processes of FIGS. 3 and 4 are written in an assembly language, to provide an infinite loop of FIG. 13.

Here, the number of IUEs per loop must be larger than twice the number of instructions to be simultaneously read out of a main memory. When executed, the target instructions cause cache misses as shown in FIG. 3. When a jump instruction is executed to enter a second execution, the target instructions are always fetched from the instruction cache and are again executed as shown in FIG. 4. Although one repetition of the loop is sufficient for measuring power consumption, the infinite loop will cause no problem because it is achieved through simulations. If required, the loop may be terminated by a proper timer interrupt. Thereafter, the machine language instructions are entered into a simulation program, which provides power consumption according to a current passing through each internal node.

In this way, the power consumption of a microprocessor in given cycles of executing the instruction file of FIG. 7 is simulated, to find out the power consumption of the microprocessor on each instruction. The instruction file of the present invention used for estimating power consumption is simple and small compared with those of the prior art, and therefore, involves greatly reduced labor and time to prepare.

Although the embodiments mentioned above relate to pipelined processing stages for executing instructions, the present invention is also applicable to executing instructions without pipelines. In this case, a target instruction is repeatedly executed at least twice with the use of a repetition instruction such as a jump instruction, to calculate the power consumption of a microprocessor on the instruction in cache miss and cache hit states. This technique is also achievable with a simple instruction file.

Figures 13, 14, 15:
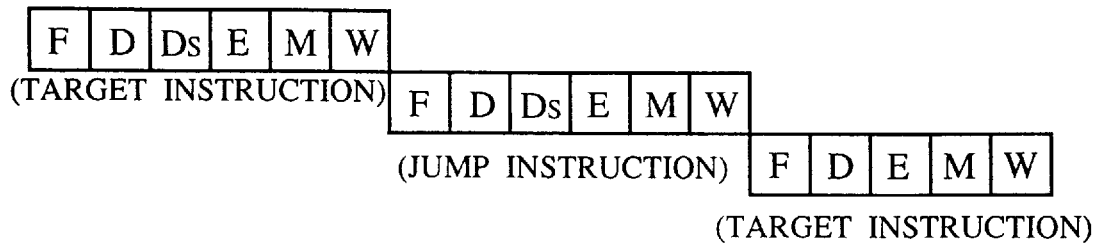
FIG. 13 shows an instruction file used by a method of estimating the power consumption of a microprocessor according to the present invention.
FIG. 14 shows another instruction file used by a method of estimating the power consumption of a microprocessor according to the present invention.
FIG. 15 shows a flow of executing the instruction file of FIG. 14.

Namely, this is the simplest form of the present invention. There are only two instructions, the first one being a target instruction and the second one being a jump instruction to jump to the target instruction. These instructions may be written in an assembler language to form an infinite loop of FIG. 14. When executed, the target instruction first causes a cache miss and is executed as shown in FIG. 15. Then, the jump instruction is executed, and the target instruction is fetched from an instruction cache and is again executed. The infinite loop may cause no problem because the loop is achieved in a simulation. The infinite loop may be terminated with a proper timer interrupt.

In summary, the present invention repeatedly executes a group of instructions whose power consumption is to be estimated, and finds out the power consumption of each instruction in an instruction cache miss state and in an instruction cache hit state according to power consumption in given cycles. Accordingly, the present invention is capable of simplifying and reducing an instruction file used to find out the power consumption of each instruction, thereby reducing labor and time for preparing the instruction file.

Various modifications will become possible for those skilled in the art after receiving the teachings of the present disclosure without departing from the scope thereof.

What is claimed is:

1. A method of estimating the power consumption of a microprocessor on each instruction the microprocessor reads out of any one of a main memory and an instruction cache and executes through pipelined processing stages, comprising the steps of:

consecutively executing, at least two times, a group of target instructions whose number is at least twice as large as the number of instructions to be simultaneously transferred from the main memory to the instruction cache;

finding the power consumption of the microprocessor in each cycle in a given range of cycles in each of the first and second executions of the instruction group;

accumulating the power consumption in each cycle for a given number of cycles in a given range of cycles in the first execution of the instruction group, to find out the power consumption of the microprocessor for the given number of cycles; and using the power consumption for the given number of cycles in the first execution the instruction group and the power consumption in each cycle in the second execution of the instruction group, to estimate the power consumption of the microprocessor of reading a cache-hit instruction out of the instruction cache and executing the same, as well as the power consumption of the microprocessor of reading a cache-missed instruction out of the main memory and executing the same, wherein:

the target instructions are executed in transistor- or gate-level simulations.

2. A method of estimating the power consumption of a microprocessor on each instruction the microprocessor reads out of any one of a main memory and an instruction cache and executes through pipelined processing stages, comprising the steps of:

consecutively executing, at least two times, a group of target instructions whose number is at least twice as large as the number of instructions to be simultaneously transferred from the main memory to the instruction cache;

finding the power consumption of the microprocessor in each cycle in a given range of cycles in each of the first and second executions of the instruction group;

accumulating the power consumption in each cycle for a given number of cycles in a given range of cycles in the first execution of the instruction group, to find out the power consumption of the microprocessor for the given number of cycles; and using the power consumption for the given number of cycles in the first execution of the instruction group and the power consumption in each cycle in the second execution of the instruction group, to estimate the power consumption of the microprocessor reading a cache-hit instruction out of the instruction cache and executing the same, as well as the power consumption of the microprocessor of reading a cache-missed instruction out of the main memory and executing the same, wherein the target instructions are executed in transistor-level or gate-level simulations, wherein the estimated power consumption (Ph) of the microprocessor on a cache-hit instruction is obtained as the power consumption thereof in a given cycle in the second execution of the instruction group, and the estimated power consumption (Pm) of the microprocessor on a cache-missed instruction is obtained as:

$Pm=\{$the sum of power consumption for "$I+N$" cycles starting from the "$P+N$"th cycle in the first execution of the instruction group$\}-\{(I-1) \times Ph\}$ where P is the number of the pipelined processing stages, I is the number of instructions to be simultaneously transferred from the main memory to the instruction cache when a cache miss occurs, and N is the total number of stalls that occur when executing the I instructions simultaneously transferred to and stored in the instruction cache.

3. A method of estimating the power consumption of a microprocessor on a target instruction the microprocessor reads out of any one of a main memory and an instruction cache and executes, comprising the steps of:

executing, at least twice, the target instruction;

finding the power consumption of the microprocessor in one cycle in a given range of cycles in each of the first and second executions of the target instruction;

accumulating the power consumption in one cycle for a given number of cycles in the given range of cycles in the first execution of the target instruction, to find out the power consumption of the microprocessor for the given number of cycles; and using the power consumption for the given number of cycles in the first execution of the target instruction and the power consumption in one cycle in the second execution of the target instruction, to estimate the cache-hit power consumption of the microprocessor reading the target instruction out of the instruction cache and executing the same, as well as the cache-missed power consumption of the microprocessor of reading the target instruction out of the main memory and executing the same, wherein the target instruction is executed in transistor-level or gate-level simulations.

4. A system for estimating the power consumption of a microprocessor on each instruction the microprocessor reads out of one of a main memory and an instruction cache and executes through pipelined processing stages, comprising:

means for entering a string of machine language instructions that include consecutive target instructions and a jump instruction to jump to the first one of the target instructions, the number of the target instructions being at least twice as large as the number of instructions simultaneously read out of the main memory;

means for carrying out transistor-level or gate-level simulations to simulate the microprocessor reading the machine language instructions out of one of the main memory and instruction cache and executing the machine language instructions;

means for estimating the power consumption of the microprocessor on a cache-missed instruction according to a result of the first execution of the consecutive target instructions; and means for estimating the power consumption of the microprocessor on a cache-hit instruction according to a result of the second execution of the consecutive target instructions.

5. The system according to claim 4, wherein the means for estimating the power consumption of the microprocessor on a cache-hit instruction estimates the power consumption (Ph) on a cache-hit instruction by obtaining the power consumption thereof in a given cycle in the second execution of the consecutive target instructions, and wherein the means for estimating the power consumption of the microprocessor on a cache-missed instruction estimates the power consumption (Pm) of the microprocessor on a cache-missed instruction as follows:

$Pm=\{$the sum of power consumption for "$I+N$" cycles starting from the "$P+N$"th cycle in the first execution of the consecutive target instructions$\}-\{(I-1) \times Ph\}$ Where P is the number of pipelined processor stages, I is the number of instructions to be simultaneously transferred from the main memory to the instruction cache when a cache miss occurs, and N is the total number of stalls that occur when executing the I instructions simultaneously transferred to and stored in the instruction cache.

6. A system for estimating the power consumption of a microprocessor on each instruction the microprocessor reads out of one of a main memory and an instruction cache and executes, comprising:

means for entering a string of machine language instructions that include at least one target instruction and a jump instruction to jump to the target instruction;

means for carrying out transistor-level or gate level simulations to simulate the microprocessor reading the machine language instructions out of one of the main memory and instruction cache and executing the machine language instructions;

means for estimating the power consumption of the microprocessor on the target instruction in a cache miss state according to a result of the first execution of the instructions; and means for estimating the power consumption of the microprocessor on the target instruction in a cache hit state according to a result of the second execution of the instructions.

* * * * *